June 7, 1960  A. J. PARRAGA  2,939,380
BEVERAGE MAKING AND DISPENSING APPARATUS
Filed Aug. 18, 1958  7 Sheets-Sheet 1
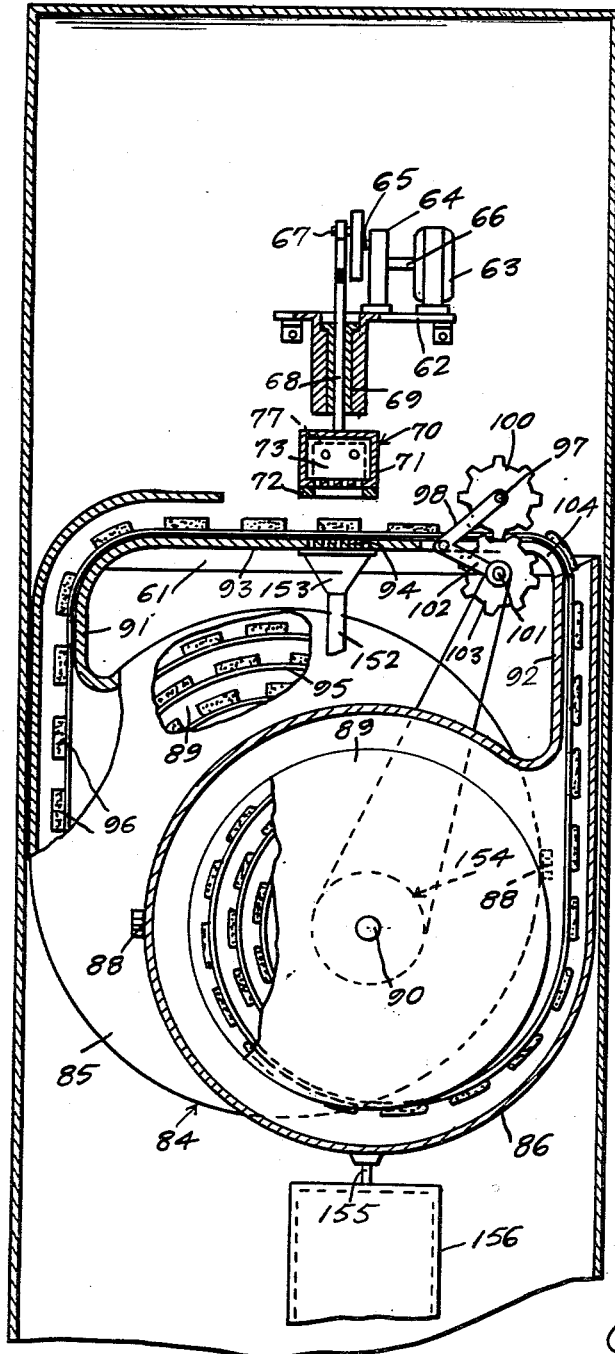
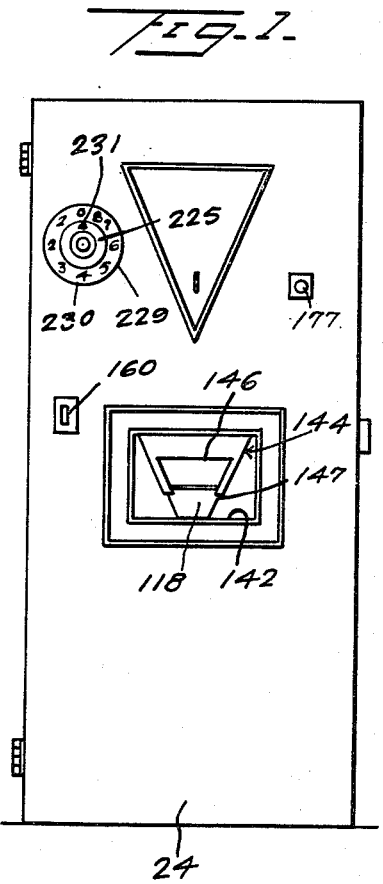
INVENTOR
A. J. Parraga
BY John N. Randolph
ATTORNEY

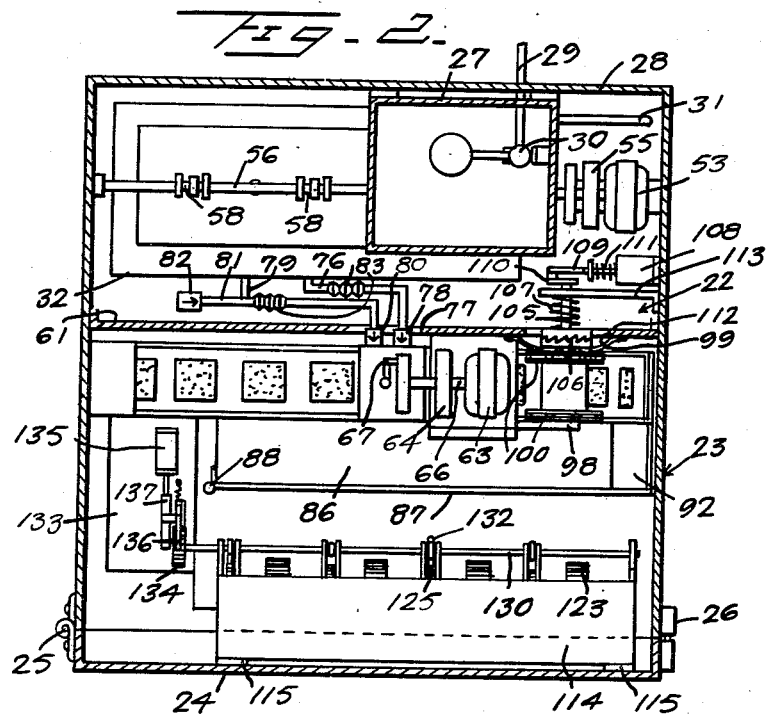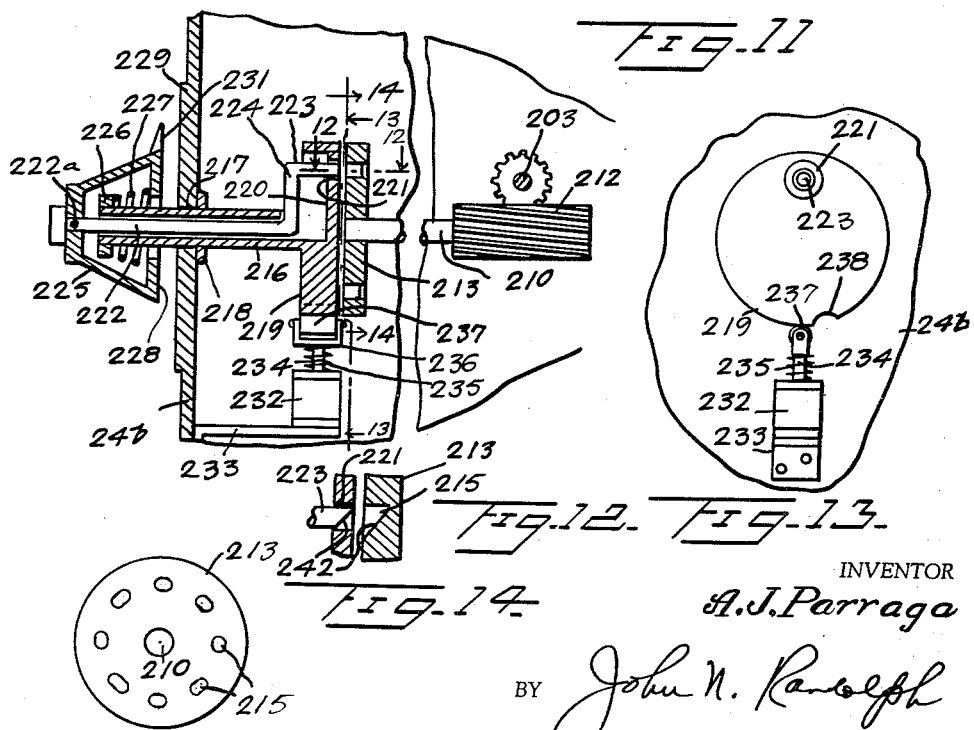

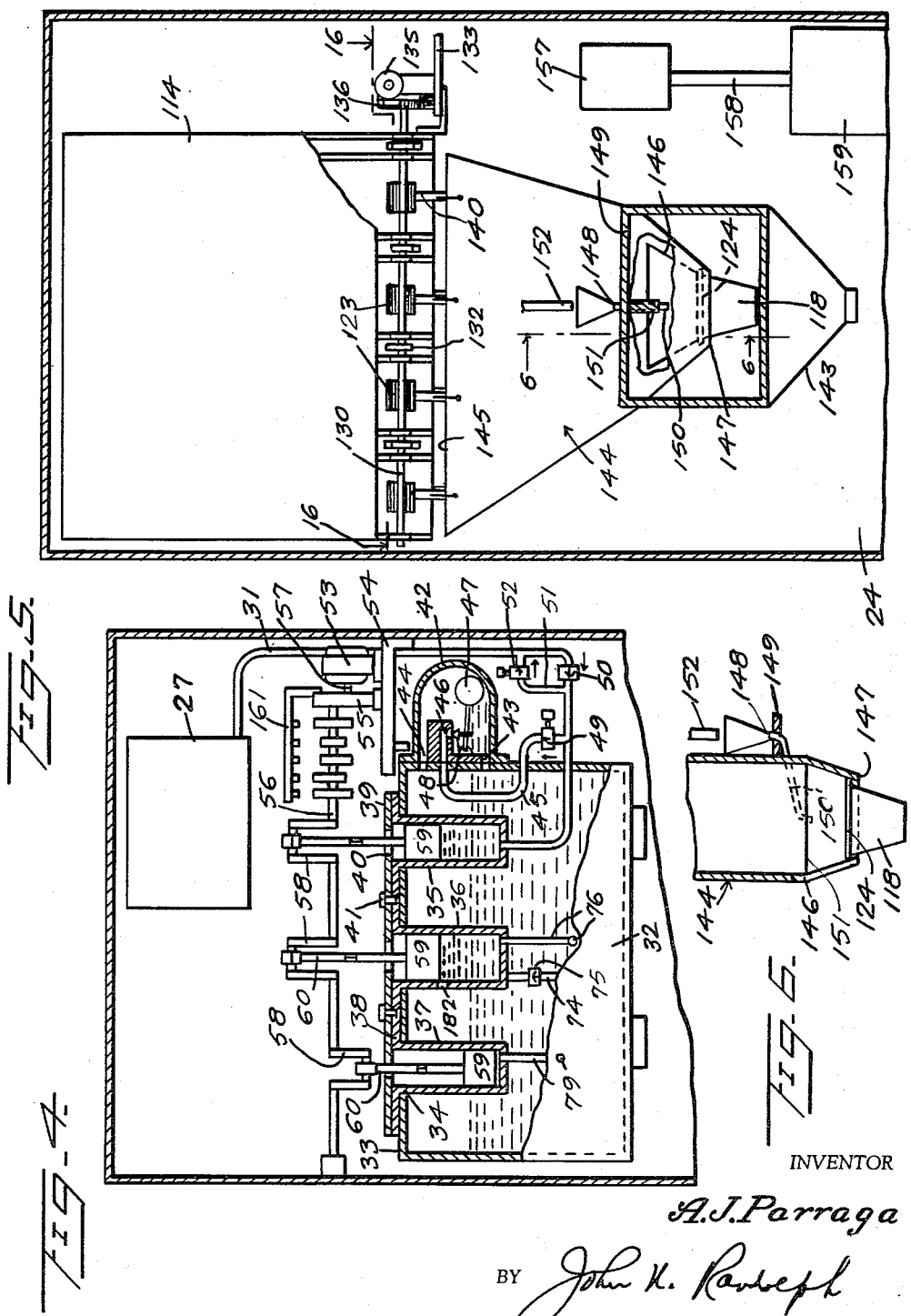

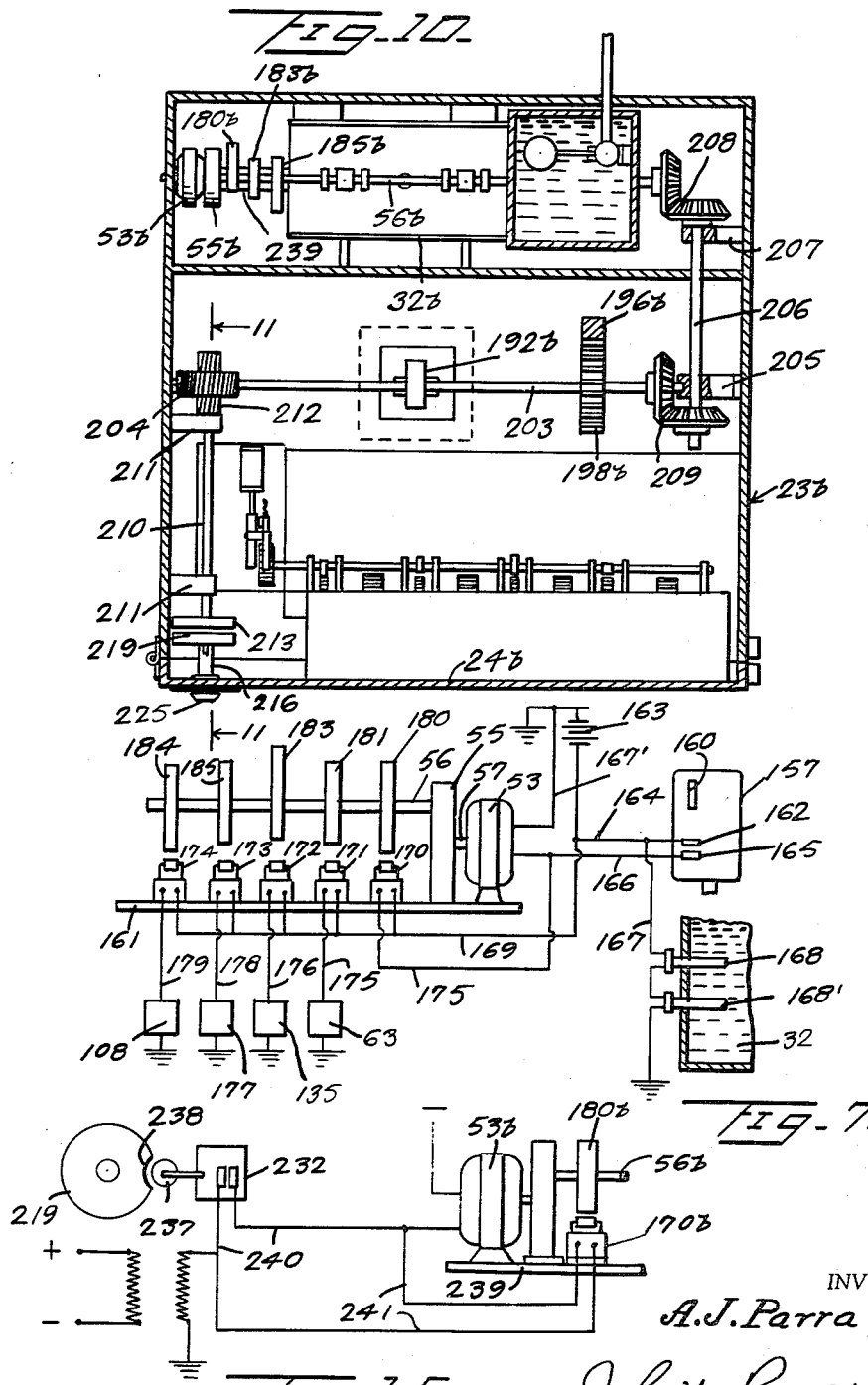

June 7, 1960 A. J. PARRAGA 2,939,380
BEVERAGE MAKING AND DISPENSING APPARATUS
Filed Aug. 18, 1958 7 Sheets-Sheet 5
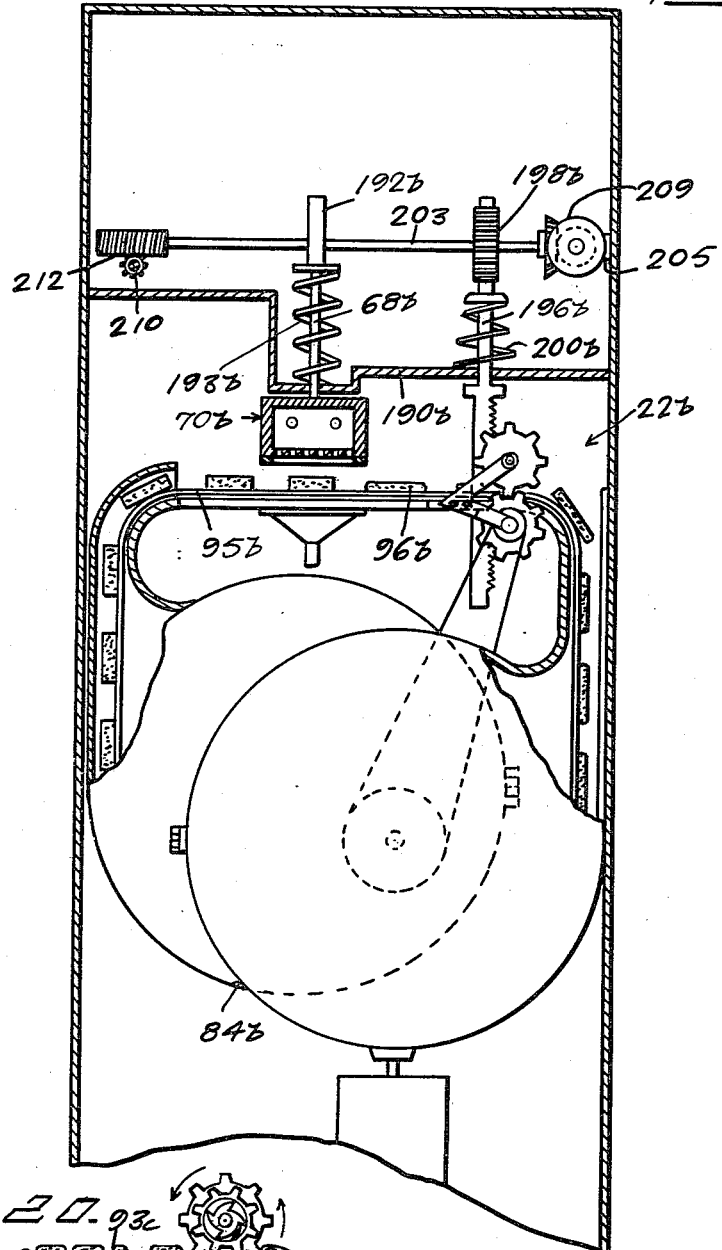
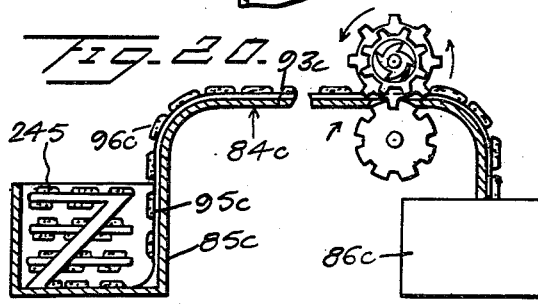
INVENTOR
A. J. Parraga
BY John H. Randolph
ATTORNEY

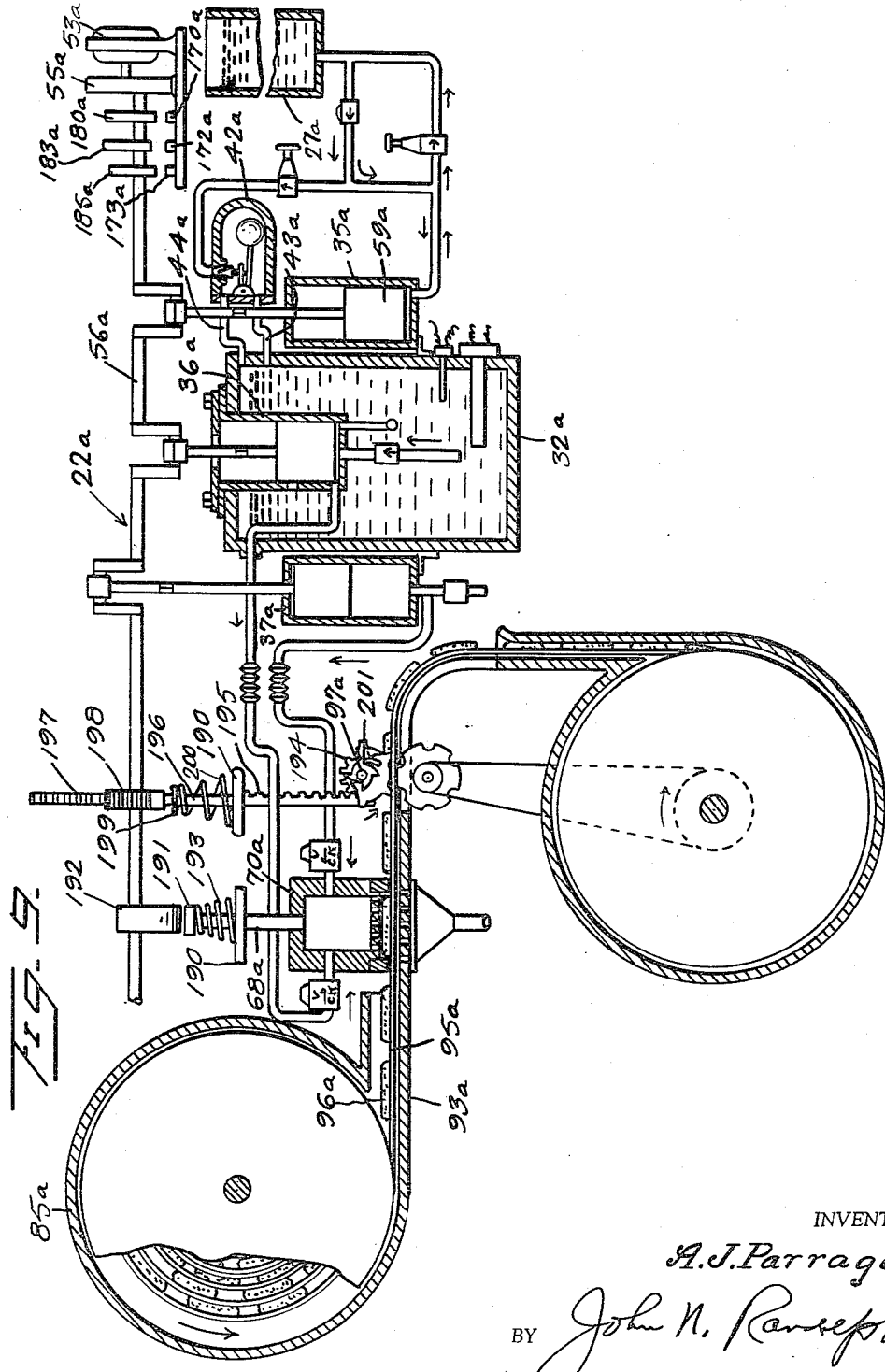

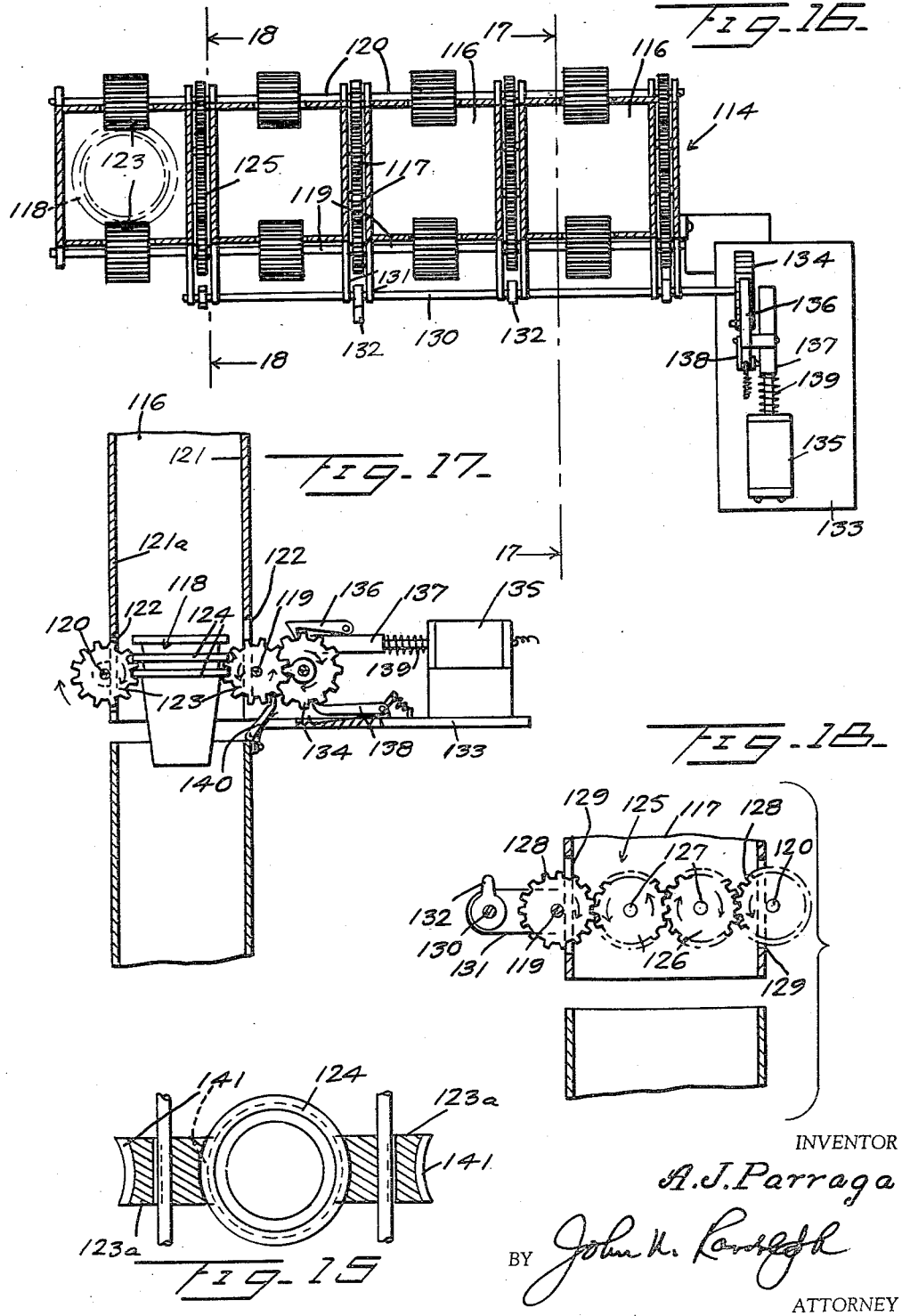

2,939,380

BEVERAGE MAKING AND DISPENSING APPARATUS

Alfredo J. Parraga, Santa Cataline 158 (Oeste), Vibora, Havana, Cuba

Filed Aug. 18, 1958, Ser. No. 755,802

2 Claims. (Cl. 99—283)

This invention relates to an apparatus capable of operating automatically to produce a palatable beverage from a dry ingredient or ingredients and water and for dispensing the beverage into a drinking receptacle supported in a position available to the user.

More particularly it is an object of the present invention to provide an apparatus especially adapted for making and dispensing hot beverages such as coffee and wherein the beverage is freshly made by the apparatus immediately before being dispensed into the drinking receptacle and so that each such beverage thus produced and dispensed by the apparatus will be identical.

More particularly, it is an aim of the present invention to provide an apparatus capable of being manually operated to produce one or a plurality of cups of coffee or other beverage, and wherein each such beverage thus produced will be separately brewed.

A further object of the invention is to provide an apparatus which is readily adapted for use as a vending machine to be operated for brewing and dispensing a beverage by the deposit of a coin.

Other objects and advantages of the invention will hereinafter become more fully apparent from the following description of the drawings, illustrating presently preferred embodiments thereof, and wherein:

Figure 1 is a front elevational view of a cabinet which may be utilized for housing a beverage making and dispensing apparatus;

Figure 2 is an enlarged horizontal sectional view of the apparatus, with certain of the parts shown in top plan;

Figure 3 is a fragmentary vertical sectional view, partly in elevation, of a portion of the apparatus;

Figure 4 is a fragmentary vertical sectional view, partly in elevation, illustrating other parts of the apparatus;

Figure 5 is an elevational view, partly in vertical section, of a portion of the apparatus which is supported by the front wall of the cabinet;

Figure 6 is a fragmentary vertical sectional view taken substantially along the line 6—6 of Figure 5;

Figure 7 is a fragmentary elevational view, partly in section and partially diagrammatic, illustrating the electric circuit of the timing unit of the apparatus;

Figure 8 is a view similar to Figure 3 but illustrating a slightly modified form of the apparatus;

Figure 9 is an extended view illustrating a substantial part of the apparatus and illustrating a slightly different arrangement from that shown in Figures 1 to 8;

Figure 10 is a horizontal sectional view, similar to Figure 2, illustrating the form of the apparatus as disclosed in Figure 8 and with certain of the parts disclosed in Figure 8 omitted;

Figure 11 is an enlarged fragmentary vertical sectional view, taken substantially along a plane as indicated by the line 11—11 of Figure 10;

Figure 12 is an enlarged fragmentary sectional view, taken substantially along a plane as indicated by the line 12—12 of Figure 11;

Figure 13 is a fragmentary vertical sectional view, taken substantially along a plane as indicated by the line 13—13 of Figure 11;

Figure 14 is a vertical sectional view, taken substantially along the line 14—14 of Figure 11;

Figure 15 is a fragmentary view partly in side elevation and partly diagrammatic illustrating the electric circuit of the apparatus of Figures 8 and 10;

Figure 16 is an enlarged fragmentary horizontal sectional view taken substantially along a plane as indicated by the line 16—16 of Figure 5;

Figure 17 is a vertical sectional view, taken substantially along a plane as indicated by the line 17—17 of Figure 16;

Figure 18 is a fragmentary vertical sectional view, taken substantially along a plane as indicated by the line 18—18 of Figure 16;

Figure 19 is a fragmentary horizontal sectional view illustrating a slight modification of the structure as shown in Figure 16, and Figure 20 is a fragmentary vertical sectional view, partly in side elevation of a modified form of a part of the apparatus as illustrated in Figures 3 and 8.

Referring more specifically to the drawings, and first with reference to Figures 1 to 7, the beverage making and dispensing apparatus as disclosed therein is designated generally 22 and includes a supporting structure shown as comprising a cabinet 23 having a hinged front wall 24 supported for swinging movement about a vertical axis on the hinges 25 and which is normally retained in a closed position by a conventional latch structure 26.

As best seen in Figures 2 and 4, a storage tank 27 is supported adjacent the top of a rear wall 28 of the cabinet. A water supply pipe 29, leading from any suitable source of water supply under pressure, preferably extends into the tank through the rear wall 28. A conventional float actuated valve 30 is connected to the outlet end of the conduit 29 for regulating the discharge of water therefrom into the tank 27 and for maintaining a predetermined water level in said tank. A supply pipe 31 extends from adjacent the bottom of the tank 27 for supplying water to a boiler 32 which is likewise disposed adjacent the rear wall 28, beneath and spaced from the tank 27. In the form of the apparatus as disclosed in Figures 1 to 7, the boiler 32 has a top wall 33 provided with three spaced openings 34. Three elongated cup shaped members forming cylinders 35, 36 and 37 have upper ends secured to or formed integral with a plate 38, through which said upper ends of the cylinders open. Said cylinders extend downwardly through the openings 34 and the plate 38 rests upon the top wall 33 for supporting the cylinders within the boiler 32. A cover plate 39 having openings 40 registering with said cylinders may be disposed on the upper side of the plate 38 and secured thereto by fastenings 41.

A receptacle 42 is secured against an end wall of the boiler 32 and the interior of said receptacle communicates with the interior of the boiler 32 through a lower passage 43 and an upper passage 44. The supply pipe 31 has an opposite end opening into the lower end of the cylinder 35. A branch 45 of the pipe 31 discharges into a downwardly opening valve seat 46 of the receptacle 42. A float 47 is mounted for vertical swinging movement within the receptacle 42 and carries a valve 48 for closing the valve seat 46 when the liquid level in said receptacle 42 and boiler 32 are at a proper height. The branch conduit 45 has a check valve 49 permitting a flow of liquid therethrough toward the valve seat 46 and preventing a flow in the opposite direction. The conduit 31 is provided with a check valve 50 located therein between the tank 27 and branch conduit 45. The conduit 31 has a bypass conduit 51 extending around the check valve 50 and containing a check valve 52 allowing a back flow only therethrough toward the tank 27.

An electric motor 53 is supported above and beyond an end of the boiler 32 by a bracket member 54 which is disposed within and secured to a part of the cabinet 23 and which also supports a reduction gearing unit 55. A shaft 56 is coupled to the motor shaft 57 by the speed reducer 55, so that said shaft 56 is driven at a substantially reduced speed relative to the motor shaft 57. The shaft 56 is provided with three cranks 58 which are disposed above the cylinders 35, 36 and 37. Pistons 59 are reciprocably mounted in said cylinders and are connected by connecting rods 60 to the cranks 58 disposed thereabove.

The cylinder 35 and its piston 59 forms a pump for maintaining a proper liquid level in the boiler 32. On each upstroke of the pump piston, water from the tank 27 is drawn past the check valve 50 toward the pump cylinder 35. If the liquid level in the boiler 32 and receptacle 42 are low so that the valve 48 is open, and if the pump has been operated sufficiently to be primed, on the downstroke of the pump piston, water will be forced upwardly through the branch conduit 45 past the check valve 49 and into the receptacle 42 to replenish the supply of water in the boiler 32. The check valve 49 opens more readily than the check valve 52. However, when the float controlled valve 48 is closed said valve with the check valve 49 offers a greater resistance than the check valve 52. Accordingly, if no water is needed in the boiler 32, water from the pump cylinder 35 will be forced back toward the tank 27 through the bypass conduit 51 and past the check valve 52 thereof when the float valve 48 is closed, to thus maintain a proper liquid level in the boiler 32 at all times.

A vertical partition wall 61 is fixedly mounted in the upper part of the cabinet 23 in front of and adjacent the tank 27 and boiler 32. A supporting bracket 62, as seen in Figure 3, is secured to and supported on the forward side of the wall 61 and provides a support for an electric motor 63 and a speed reduction unit 64. A shaft 65 is coupled to the motor shaft 66 by said unit 64 and is driven at a reduced speed relative to the motor shaft 66. A crankpin 67 is driven by the shaft 65 and is connected to one end of a connecting rod 68 which extends downwardly therefrom and is reciprocably mounted in a guide 69. The guide 69 is supported by and depends from the bracket 62. A hollow infuser head 70 is supported by the lower end of the rod 68, beneath the guide 69 and includes a perforated bottom wall 71, the perforated portion of which is surrounded by a gasket 72 which is secured to and extends downwardly from said head 70.

The cylinder 36 and its piston 59 constitutes a water pump for supplying a measured charge of water to the hollow interior or chamber 73 of the head 70, on each downstroke of said piston 59. The pump cylinder 36 has an inlet conduit 74 opening into the bottom thereof and which communicates with the interior of the boiler 32, beneath said cylinder 36. The inlet conduit 74 contains a check valve 75 opening toward the cylinder 36. An outlet pipe or conduit 76 extends from the bottom of the cylinder 36 through the front wall of the boiler 32, loosely through an opening 77 of the partition 61, and has an opposite end opening into the infuser chamber 73. Said conduit 76 includes a check valve 78 opening toward the chamber 73.

The cylinder 37 and its piston 59 forms an air pump and has a pipe or conduit 79 extending from the bottom thereof outwardly through the front wall of the boiler 32, through the opening 77, and with the discharge end of said conduit 79 opening into the infuser chamber 73. The conduit 79, adjacent its discharge end is provided with a check valve 80 which opens toward the infuser chamber. As seen in Figure 2, conduit 79 has a branch portion 81 disposed externally of the boiler 32 and between the cylinder 37 and check valve 80. The branch portion 81 has an inwardly opening check valve 82 at the inlet end thereof through which air is drawn into the conduit 79 and cylinder 37 on the upstroke of the piston 59 of said cylinder. The conduits 76 and 79 have flexible portions 83 permitting the ends thereof, which are connected to the infuser head 70 to move upwardly and downwardly therewith in the partition opening 77.

A conveyor apparatus is disposed in the cabinet 23 beneath the infuser head 70. Said apparatus, designated generally 84, includes substantially cylindrical housings 85 and 86 constituting end portions of the conveying apparatus. Said housings 85 and 86 have remote sides 87 which are hingedly mounted at 88 for outward swinging movement to open positions. Each housing has a reel 89 disposed therein and supported on a shaft 90 for rotation of the reels within the housings. The housings 85 and 86 have upwardly extending passages at the remote ends thereof. The passage 91 of the housing 85 constitutes the outlet thereof, and the passage 92 of the housing 86 constitutes the inlet. The conveyor structure 84 includes a rigid plate or bar 93 extending between the outlet 91 and inlet 92 and which has a perforated portion 94 disposed directly beneath the infuser head 70.

A flexible tape 95 is wound on the reel 89 of the housing 85 and has an end extending therefrom through the outlet 91, along the upper side of the bar 93, thence through the inlet 92, and the opposite end of said tape is wound on the reel 89 of the housing 86. Packages 96 are secured to longitudinally spaced portions on the outer side of the tape 95 in any conventional manner. Each package 96 contains freshly ground coffee, or a mixture of ground coffee and sugar or cream, in a dry form, or a combination of the three ingredients. Each package 96 includes a wrapping of filter paper, and the portion of the tape 95, to which the package is secured, is likewise preferably formed of filter paper or is otherwise made readily pervious to water.

A shaft 97 is disposed above the bar 93, adjacent the inlet 92 and is journaled in a bearing 98, which is secured to and extends from a side edge of the bar 93, and a bearing 99 which is secured to the partition 61. Two toothed wheels 100 are fixed to the shaft 97, in spaced apart relation to one another. A shaft 101 is disposed beneath the bar 93 and directly beneath the shaft 97 and has one end journaled in a bearing 102 constituting a branch of the bearing 98, and an opposite end journaled in the partition 61. Two toothed wheels 103 are fixed to the shaft 101, in the same vertical planes as the toothed wheels 100, and have portions extending upwardly into recessed edges 104 of the bar 93 and which mesh with portions of the wheels 100. The edge portions of the tape 95 are engaged between the meshing teeth of the wheels 100 and 103 for effecting movement of said tape along the bar 93 from left to right of Figures 2 and 3. To accomplish this movement, the upper shaft 97 is connected to a shaft 105 by a claw clutch 106 which is yieldably held engaged by a spring 107. A solenoid 108 is supported by a wall of the cabinet 23 and is connected by a link 109 to a crank 110 of the shaft 105 for turning said shaft, the engaged clutch 106 and shaft 97 counterclockwise as seen in Figure 3 to effect the advancement of the tape 95. The clutch 106 disengages to allow the shaft 105 to be turned in the opposite direction and back to its initial position by a compression spring 111, when the solenoid is de-energized. The clutch 106 is disposed in an opening 112 of the partition 61 and the shaft 105 is journaled in a bearing 113, which may be supported by a wall of the cabinet 23.

As seen in Figure 2, a housing 114 is secured by suitable brackets 115 to the inner side of the cabinet front wall 24 and is disposed adjacent the top of said front wall, as seen in Figure 5. The housing 114 constitutes a magazine which is divided into vertical spaces 116 by partition walls 117, as best seen in Figure 16. At one end of the magazine 114 and between each two adjacent spaces 116 two such partition walls 117 are provided and are disposed in spaced apart relation to one another. Each space 116 is adapted to contain a stack of drinking cups 118 of a conventional disposable type. A plurality of shafts 119 and a plurality of shafts 120 are disposed on outer sides of spaced parallel walls 121 and 121a, respectively, of the magazine 114 and each shaft 119 and 120 extends through and is journaled in extensions of two of the partitions 117. Shafts 119, and likewise shafts 120, are disposed in aligned end-to-end relation to one another. Said walls 121 and 121a have openings 122 communicating with each of the cup compartments 116. A spur gear 123 is fixed to each shaft 119 and 120 and extends inwardly through the opening 122 across which said shaft extends. The spur gears of the oppositely disposed shafts 119 and 120 are spaced apart a distance so that said spur gears are disposed in the cup column 116 which said shafts straddle to mesh with the flanges 124 of the two bottommost cups of the cup stack contained in said column.

The shafts 119 and 120 are connected by four trains of gears 125 which are disposed between the walls of each pair of partition walls 117. Each such gear train 125 connects a shaft 119 to the shaft 120, disposed opposite thereto, and includes two intermediate gears 126 which are fixed to or journaled on shafts 127, which shafts are supported by the walls of said pair of walls 117, and two gears 128 which are fixed to said shafts 119 and 120. The gears 128 extend through openings 129 in the housing walls 121 and 121a and mesh with the intermediate gears 126, which in turn mesh with one another, as clearly illustrated in Figure 18. Thus, when any shaft 119 is rotated the shaft 120, disposed opposite thereto, will be rotated in the opposite direction.

A shaft 130 is journaled in extensions 131 of the partition walls 117 and is spaced outwardly from the shafts 119 and the gears fixed thereto. Four single toothed gears 132 are fixed to the shaft 130 in alignment with the four gears 128 of the shafts 119 and are disposed with the teeth thereof turned at 90° arcs relative to one another.

A bracket 133 is disposed beyond one end of the housing 114 and is preferably supported thereby. A ratchet wheel 134 is fixed to an end of the shaft 130 and is disposed over a part of the bracket 133. A solenoid 135 is fixed to and supported on the bracket 133. A pawl 136 is pivotally mounted on an extension 137 of the armature of the solenoid and is disposed to engage between the teeth of the ratchet wheel 134 for turning said ratchet wheel and the shaft 130 clockwise, as seen in Figure 17, when the solenoid 135 is energized, for moving the pawl 136 from left to right toward said solenoid. A holding pawl 138 is pivotally mounted on the bracket 133 and spring urged into engagement between the teeth of ratchet wheel 134 to allow said ratchet wheel to be turned clockwise by the pawl 136 and to prevent the ratchet wheel from turning in the opposite direction on the return stroke of the pawl 136. The pawl 136 is moved in the opposite direction or away from the solenoid 135 and relative to the ratchet wheel 134 by a compression spring 139. A holding pawl 140 is pivotally mounted beneath each gear 123 of the shafts 119 and is spring urged into engagement between the teeth of said gear to allow the gear to turn counterclockwise, as seen in Figure 17, but to prevent clockwise turning of said gear. Thus, each time that the pawl 136 is displaced toward the solenoid 135 to turn the ratchet wheel 134 a quarter of a revolution in a clockwise direction, one of the four single toothed gears 132 will mesh with and turn its associated gear 128 a twelfth of a revolution counterclockwise to thus turn the shaft 119 and the gear 123 thereof counterclockwise a twelfth of a revolution. Similarly, the shaft 120, disposed opposite said shaft 119, and its gear 123 will be simultaneously rotated clockwise a twelfth of a revolution by the gear train 125 which is associated with said shafts 119 and 120. Each time that two opposed gears 123 are thus rotated, the adjacent portions of said gears will move downwardly so that flange 124 of the bottommost cup disposed therebetween will be disengaged by the gear teeth and released to drop downwardly by gravity from the column 116. As the gears 123 disengage the flange 124 of the bottommost cup, said gears assume positions in meshing engagement with the flanges 124 of the two cups disposed immediately above the cup just previously released. Cups are thus released successively from the four stacks of cups 118, so that the number of cups in each column 116 will be substantially the same at all times.

Figure 19 illustrates a slight modification and wherein gears 123a are substituted for the gears 123. The gears 123a have their toothed peripheries 141 concavely bowed in cross section to conform to the curvature of the portions of the cup flanges 124 engaged thereby.

As seen in Figure 1, the cabinet front wall 24 has a relatively large opening 142. As seen in Figure 5, a receptacle 143 is secured to the inner side of the front wall 24 and has an open front which registers with the opening 142. A chute 144 has an enlarged open upper end 145 which is disposed directly beneath the open lower ends of the four columns 116 for receiving the cups 118 which are released therefrom. The holding pawls 140 are pivotally supported on said upper end 145 of the chute. Said chute 144 tapers downwardly and has a restricted lower end extending downwardly into the upper portion of the container 143. Said restricted lower end of the chute 144 has an opening or notch 146 in the front side thereof and has a restricted opening 147 in the lower end of the chute in which the flange 124 of a cup 118, fed downwardly through said chute, is releasably confined to support the cup. The opening or notch 146 opens downwardly through said bottom opening 147. A funnel member 148 extends downwardly through the top wall 149 of the container 143 and has an angularly extending lower discharge end 150 which extends into the lower portion of the chute 144 and is disposed in a partition 151 and discharges from the lower end of said partition. The partition 151 extends between the front and back walls of the chute 144 and is disposed midway between the tapered side walls thereof, so that the cups 118 can slide downwardly on either side of the partition to be engaged in the opening 147. With a cup 118 thus supported in opening 147, the discharge end 150 of the funnel is positioned to discharge into said cup.

A rigid conduit 152 has a flared upper inlet end 153 which is disposed against and secured to the underside of the bar 83 around the perforated portion 94 thereof. The lower discharge end of the conduit 152 is disposed directly above the flared upper end of the funnel 148 when the cabinet front wall 24 is in a closed position, as seen in Figures 5 and 6.

The shaft 90 of the reel contained in the housing 86 is connected to the shaft 101 by a belt and pulley drive 154, as seen in Figure 3. A drain pipe 155 is supported by and extends downwardly from the bottommost portion of the housing 86 and discharges into the receptacle 156 which is mounted in the cabinet 23, beneath said drain pipe 155.

A coin box 157, as seen in Figure 5, is mounted on the inner side of the cabinet front wall 24 and a conduit 158 leads from the lower end of said coin box to a coin receptacle 159 disposed therebeneath. The wall 24 has a coin slot 160, as seen in Figure 1, which opens into the upper part of the box 157.

As seen in Figure 4 and as illustrated diagrammatically in Figure 7, a plurality of electric switches are supported by a bracket member 161 which is connected to and extends from the speed reducer 55, and the portion of the shaft 56, located between said speed reducer 55 and the adjacent crank 58, is provided with cams for operating the switches. One contact 162 of a coin actuated switch is connected to electric current source 163 by a conductor wire 164. The other contact 165 of said switch is connected by a conductor wire 166 to one post of the motor 53. A ground wire 167' leads from the other post of the motor 53. A grounded wire 167 leads directly from the wire 166 and has interposed therein an electric heating element 168 and a thermostat 168' for heating the water contained in the boiler 32 and for maintaining the water at a desired temperature. A conductor wire 169 forms a branch of the conductor 164 and has branches which are connected in parallel to one another to the five swtches 170, 171, 172, 173 and 174 which are supported by the bracket 161. A conductor wire 175 leads from the other contact of the switch 170 to the conductor wire 166. The electric motor 63 is interposed in the other ground connection 175 of the switch 171; the solenoid 135 is interposed in the other ground connection 176 of the switch 172; and a lamp bulb 177 is interposed in the other ground connection 178 of the switch 173, and the solenoid 108 is interposed in the other ground connection 179 of the switch 174. The light bulb 177 can be mounted on the exterior of the front wall 24.

The switch 162, 165 is contained in the box 157 beneath the coin slot 160. A coin inserted through the slot 160 strikes the contact 162 for closing the switch 162, 165 to momentarily energize the motor 53 for turning the shafts 57 and 56 sufficiently to move a cam 180, of the shaft 56 into engagement with the switch 170. Said switch is thus closed to form a holding circuit for maintaining the motor 53 energized, after the switch 162, 165 has resumed an open position, and until the shaft 56 has completed one revolution and so that the cam 180 has disengaged the switch 170. A cam 181 of the shaft 56 closes the switch 171 to energize the motor 63 for a sufficient period to cause the shaft 65 and crank 67 to turn a half revolution for displacing the discharge head 70 downwardly over the filter package 96 disposed directly therebeneath and so that the gasket 72 will engage the tape 95 around said filter package and press it against the bar 93 for sealing the filter package within said gasket. The cam 181 then releases the switch 171 which resumes an open position to de-energize the motor 63, while the discharge head is in its lowermost position. This downward displacement of the discharge head 70 will occur during the initial movement of the shaft 56. Immediately thereafter the crank 58, associated with the piston 59 of the water pump cylinder 36, will displace said piston downwardly for forcing water from said cylinder 36 through the conduit 76 into the chamber 73 past the check value 78. A port 182 is provided in the wall of the cylinder 36 to prevent a high pressure occurring in said cylinder. After the hot water has been supplied to the chamber 73, the piston 59 of the air pump cylinder 37 will be displaced downwardly to force compressed air in the chamber 73 to assist in expelling the hot water therefrom through the perforated bottom 71 of the infuser head 70 and through the ground coffee contained in the package 96, over which the infuser head 70 is disposed. The coffee is produced by the hot water passing through the filter package 96 and this coffee then flows through the bores 94, conduit 152 and conduit 148 into a cup supported by opening 147, as seen in Figure 6.

At the commencement of the previously described operation, the cam 183 of the shaft 56 engages and momentarily closes the switch 172 for energizing the solenoid 135 for discharging a cup 118 from one of the columns 116. This cup 118 assumes a position supported in the opening 147 to receive the coffee, brewed and dispensed as heretofore described. The user by lifting upwardly on the filled cup 118 can remove it through the opening or notch 146 and through the cabinet front wall opening 142.

After the coffee has been brewed and dispensed into the conduit 152, the cam 181 re-engages and again closes the switch 171 so that the motor 63 is re-energized to again turn the shaft 65 a half revolution to move the crank 67 back to its raised position of Figure 3 for elevating the discharge head 70.

A cam 184 of the shaft 56 engages and closes the switch 174 to energize the solenoid 108 for turning the shafts 105 and 97 counterclockwise a part of a revolution so that the toothed wheels 100 and the toothed wheels 103 which mesh with said wheels 100 will move the tape 95 from left to right of Figure 3 for positioning a fresh filter package 96 beneath the discharge head 70 at the beginning of the functioning of the apparatus. This movement of the toothed wheels 103 and shaft 101 will drive the shaft 90 through the belt and pulley drive 154 for turning the reel 89 of the casing 86 for winding a used portion of the tape 95 on said reel. Moisture draining into said casing 86 from the used filter packages 96 will escape through the drain pipe 155 into the collecting receptacle 156. A cam 184 will thereafter disengage and permit opening of the switch 174 to de-energize the solenoid 108 before the shaft 56 has completed its revolution. When this occurs, the spring 111 will turn the shaft 105 in the opposite direction, and the clutch 106 will allow the shaft 105 to turn relative to the shaft 97, when thus actuated by the spring 111.

The cam 185 will engage and maintain the switch 173 closed during substantially the entire time that the shaft 56 is making its revolution to maintain the bulb 177 energized to indicate that the apparatus is in operation and that another coin should not be deposited through the slot 160 while the bulb remains illuminated.

Also while the shaft 56 is making its revolution, it will operate the piston of the pump cylinder 35 for replenishing the water in the boiler 32 if necessary, as previously described. As the shaft 56 completes its revolution the cam 180 disengages and permits the switch 170 to open to thereby break the electric circuit to the motor 53.

Figure 9 illustrates a slightly modified form of the apparatus 22. The apparatus 22a as shown in Figure 9 readily adapts itself to be mounted in a horizontally elongated cabinet, not shown. The boiler 32a is made smaller than the boiler 32 and only the water pump cylinder 36a is contained therein. Said water pump and the air pump furnish hot water and air, respectively, under pressure to the infuser or discharge head 70a in the same manner as previously described in reference to the apparatus 22; however, the cylinder 37a of the air pump is mounted externally of the boiler 32a. The pump for replenishing the supply of water in the boiler 32a functions in the same manner as the water supply pump 35, 59; however, the cylinder 35a of the water pump 35a, 59a is also mounted externally of the boiler 32a. The chamber 42a, which replaces the chamber 42, is spaced from the boiler 32a and is supported by tubes 43a and 44a which replace the passages 43 and 44, respectively, and the means for supplying water to the boiler 32a from the tank 27a otherwise corresponds to the means as previously described in connection with the apparatus 22. The shaft 56a functions for operating the three pumps associated with the boiler 32a, in the same manner as the shaft 56.

The tape 95a is supported and conveyed in the same manner as the tape 95, except that the casing 85a is disposed above, rather than beneath, the bar 93a. A rod 68a, which replaces the rod 68, extends upwardly from the infuser head 70a reciprocably through a fixed support 190. Said rod 68a has a head 191 at its upper end disposed beneath a cam 192 which is fixed to the shaft 56a. A compression spring 193 is mounted on the rod 68a between the guide 190 and the head 191 for normally urging said rod and the infuser head 70a to a raised position. The parts 190—193 replace the parts 62—67, and 69 of the apparatus 22.

In lieu of the solenoid 108 and the parts associated therewith for turning the shaft 97 in one direction, the shaft 97a is turned counterclockwise for feeding the tape 95a from left to right beneath the infuser head 70a by a ratchet wheel 194 which is mounted on the shaft 97a and meshes with a rack 195. The rack 195 extends slidably through another part of the guide 190 and constitutes the lower end of a bar 196, and the upper end of said bar 196 forms a second rack 197 which is disposed to be engaged by a gear segment 198 which is fixed to the shaft 56a. A collar 199 is fixed to the bar 196, immediately below the rack 197, to provide an abutment for the upper end of a compression spring 200. The lower end of the spring 200 rests on the guide 190 and urges the racks 195 and 197 to an elevated position as illustrated. A pawl and ratchet 201 connects the ratchet wheel 194 to the shaft 97a for turning the shaft 97a counterclockwise and for permitting the ratchet wheel 194 to turn clokwise relative to said shaft. When the shaft 97a is turned counterclockwise, the tape 95a is fed from left to right beneath the infuser head 70a in the same manner that the tape 95 is moved.

The shaft 56a in addition to operating the pistons 59a of the three pump cylinders 35a, 36a and 37a during each revolution thereof, additionally revolves the cam 192a to displace the infuser head 70a downwardly, and also rotates the gear segment 198a to displace the bar 196 downwardly. The cam 192 first moves the infuser head 70a downwardly so that coffee can be brewed in the same manner as previously described with reference to the apparatus 22. The cam 192 then moves out of engagement with the head 191 so that the spring 193 can return the infuser head 70a to an elevated position. Immediately thereafter the gear segment 198 moves into meshing engagement with the rack 197 and thereafter in its downward travel displaces the rack 197 and likewise the rack 195 downwardly. The rack 195 in traveling downwardly turns the ratchet wheel 194 and shaft 97a counterclockwise. Before the shaft 56a completes its revolution the ratchet wheel 198a disengages the rack 197 so that the spring 200 can move the racks back to their elevated positions of Figure 9, during which movement the ratchet wheel 194 rotates relative to the shaft 97a. If preferred, the rack 198 and cam 192 can be so disposed on the shaft 56a that the tape 95a will be initially moved to position a fresh filter package 96a beneath the infuser head 70a before said head is displaced downwardly.

The shaft 56a is driven by a motor 53a through a reduction gearing 55a. The electric circuit of the motor 53a may correspond to the electric circuit of the motor 53, as previously described and as illustrated in Figure 7. However, in lieu of the five switches and five cams of the timing unit as shown in Figure 7, the apparatus 22a employs a simplified timing unit including only the three switches 170a, 172a and 173a, and which are actuated by the cams 180a, 183a and 185a, respectively. Cam 180a closes the switch 170a in the same manner and for the same purpose that the switch 170 is closed by the cam 180. Cam 183a closes the switch 172a in the same manner and for the same purpose that the switch 172 is closed by the cam 183, and the cam 185a closes the switch 173a in the same manner and for the same purpose that the switch 173 is closed by the cam 185. The cup holding and dispensing means of the apparatus 22a corresponds with and functions in the same manner as the cup holding and dispensing means of the apparatus 22 and accordingly the illustration and description thereof is not repeated.

Figure 8 and 10 to 15 disclose another variation of the beverage maker and dispenser, designated generally 22b, which includes a conveyor apparatus 84b, corresponding to the apparatus 84. The infuser head 70b is supported by a rod 68b, a spring 193b and a stationary guide 190b, and is displaced downwardly by a cam 192b, in the same manner as the infuser head 70a. The tape 95b carrying the filter packages 96b is moved from left to right, as seen in Figure 8, beneath the infuser head 70b by an actuating means corresponding to the actuating means of the apparatus 22a and including a double rack bar 196b which is intermittently displaced downwardly by a gear segment 198b and which is moved upwardly by a compression spring 200b.

The apparatus 22b utilizes a boiler 32b, corresponding to the boiler 32, and including the parts associated therewith. The crankshaft 56b operates the cranks associated with the boiler 32b and is driven by an electric motor 53b through a reduction gearing 55b.

A shaft 203 is disposed parallel to the shaft 56b and is journaled in bearings 204 and 205 which are supported by opposite side walls of the cabinet 23b. The cam 192b and the gear segment 198b are fixed to the shaft 203. A countershaft 206 is journaled in the bearing 205 and a bearing 207 and is connected to shaft 56b by meshing bevel gears 208 and to shaft 203 by meshing bevel gears 209.

A shaft 210 is journaled in bearings 211 which are supported by one side wall of the cabinet 23b. The end of the shaft 203, disposed remote from the meshing bevel gears 209, is connected to the shaft 210 by a worm gear 212. A disc 213 is fixed to the forward end of the shaft 210 and is provided in its forward face with circumferentially spaced sockets 215, as best seen in Figures 11, 12 and 14.

A hollow shaft 216 is journaled in an opening 217 of the cabinet front wall 24b and has a collar 218 secured thereto and disposed against the inner side of the wall 24b. A disc 219 is fixed to the inner end of the hollow shaft 216 and is disposed adjacent to and facing the forward side of the disc 213. The disc 219 has a radial recess 220 in its opposite, forward side and an opening 221 opening through the rear side thereof and into the outer end of said recess.

A rod 222 extends loosely through the hollow shaft 216 and has a laterally offset end 223 extending through the opening 221 and which is connected to the first mentioned rod portion by a part 224 of said rod which engages in the recess 220.

The outer end of the hollow shaft 216 extends into a hollow knob 225 which is mounted by said hollow shaft on the outer side of the wall 24b. The outer end of the rod 222 is secured to the outer end of the knob 225 by a pin 222a. A collar 226 is secured to the outer end of the hollow shaft 216 and is disposed within the hollow knob 225. A compression spring 227 is contained within the knob 225 and has one end bearing against the inner wall 228 of said knob and its opposite end bearing against the collar 226, for urging said knob 225 and the rod 222 inwardly relative to the hollow shaft 216 and disc 219 for projecting the offset rod portion 223 through the opening 221 and into engagement with a socket 215 of the disc 213. Said rod portion 223 forms a finger for cooperation with any one of the sockets 215 for disengageably coupling the disc 219 and hollow shaft 216 to the shaft 210.

The knob 225 is shown in Figure 1 mounted on the forward side of the cabinet front wall; however, normally said knob and the parts associated therewith will not be utilized in conjunction with a beverage making and dispensing apparatus which is coin operated. The part of the cabinet front wall surrounding the knob 225 forms a dial face 229 having a ring of circumferentially spaced numerals 230 arranged counterclockwise and spaced apart a distance relative to one another corresponding to the spacing between the sockets 215. The knob 225 has a pointer 231 for use with said dial face 229.

A normally open electric switch 232 is supported by a bracket 233 which is secured to the inner side of the wall 24b. Switch 232 is disposed in a position spaced from a part of the periphery of the disc 219 and has a slidably mounted actuator rod 234 extending outwardly therefrom toward the disc 219 and spring urged by a spring 235 to an extended position. Rod 234 has a fork 236 at its outer end in which a roller 237 is journaled. The roller 237 normally bears against the periphery of the disc 219 and when so disposed holds the actuator rod 234 displaced inwardly of the switch 232 for maintaining said switch in a circuit closing position. The periphery of the disc 219 is provided with a groove 238 to receive the roller 237, in one position of rotation of said disc 219, for permitting the spring 235 to displace the rod 234 outwardly to open the switch 232.

As seen in Figure 10, the shaft 56b carries three cams 180b, 183b and 185b for closing three switches corresponding to the switches 170a, 172a and 173a, respectively. Said switches are mounted beneath the cams on a supporting bracket 239. The switch 170b, actuated by the cam 180b is shown in Figure 15. As seen in this view, the normally open switch 232 is interposed in an electric circuit 240 of the motor 53b, and the switch 170b is interposed in a secondary holding circuit 241 of the motor 53b.

When the roller 237 is engaging the groove 238 and the switch 232 is in an open position, the pointer 231 is disposed over the "0," between the numerals "1" and "8" of the dial face 229. The knob 225 can be turned clockwise for turning the shaft 216 and disc 219 together with the rod 222, relative to the shaft 210 and disc 213. As seen in Figure 12, the sockets 215 and finger 223 are beveled, as indicated at 242, to allow the finger 223 to be cammed out of each socket 215 as the disc 219 is turned clockwise relative to the disc 213, looking from left to right of Figure 11. In this manner the pointer 231 can be set over a selected numeral 230 designating the number of cups of coffee to be dispensed in succession without interruption of the operation of the apparatus 22b. When the knob 225 is thus set the finger 223 will be urged into engagement with a socket 215 by the spring 227. This turning of the disc 219 will move the groove 238 thereof out of engagement with the roller 237 to effect closing of the switch 232 to complete the electric circuit 240 for energizing the motor 53b.

The operation of the apparatus 22b in dispensing a plurality of cups of coffee in succession and without interruption of the operation of the apparatus, will be the same as previously described in connection with the apparatus 22a, except that the switch 170b and the cam 180b will not be effected to break the electric circuit to the motor 53b until the disc 219 has been turned with the disc 213, sufficiently to return the groove 238 to a position to receive the roller 237. This will occur as the last cup of coffee is being dispensed. At such time the circuit 240 will be broken but the motor 53b will be maintained energized by the closed circuit 241 until dispensing of the last cup of coffee has been completed and the cam 180b permits the switch 170b to resume an open position to break the circuit 241. Rotation of the shaft 56b drives the shaft 203 which in turn drives the shaft 210 through the worm gear 212. The shaft 210 rotates clockwise, as viewed from left to right of Figure 11 and makes one revolution to each eight revolutions of the shaft 203. The finger 223 is held in engagement with one of the sockets 215 by the spring 227, during this clockwise rotation of the disc 213, so that the disc 219, hollow shaft 216, rod 222 and knob 225 will turn in unison with the shaft 210 until the switches 232 and 170b have both resumed open positions.

Figure 20 illustrates a simplified form of tape conveyor 84c wherein open top containers 85c and 86c replace the housings 85 and 86, respectively. The tape 95c containing the unused filter packages 96c is stored in lapped form, as seen at 245, in the box 85c and is withdrawn therefrom and conveyed across the upper side of the bar 93c by a conveying apparatus corresponding to that disclosed in Figure 9. The used filter packages 96c and the tape portion on which said packages are carried are deposited in the open top waste storage box 86c.

Various other modifications and changes are contemplated and may be resorted to, without departing from the function or scope of the invention as hereinafter defined by the appended claims.

I claim as my invention:

1. A beverage making and dispensing apparatus comprising an infuser head having a bottom provided with an outlet, a tape, a plurality of filter packages each containing a dry beverage mixture supported by said tape in spaced apart relation to one another, means supporting said tape including a rigid perforated portion disposed beneath the infuser head, a conduit having an upper inlet end disposed directly beneath said perforated portion of the tape supporting means, means intermittently moving the infuser head downwardly onto the filter package of the tape disposed beneath the infuser head and upwardly away from said tape, means supplying a charge of water under pressure to the infuser head, while the infuser head is in a lowered position, for discharge of the water through said outlet and through the filter package, disposed therebeneath, to form a beverage which is dispensed by gravity through said perforated portion of the tape supporting means and through said conduit, intermittently driven means connected to the tape for advancing the tape along said tape supporting means, while the infuser head is in a raised position, to position a fresh filter package beneath the infuser head, an electrically driven timing mechanism to which said infuser head moving means, said water supply means and said intermittently driven means are connected for causing the parts of the apparatus to function in timed sequence to produce and discharge the beverage automatically when the timing mechanism is energized, and manually controlled means for selectively adjusting said timing mechanism for maintaining the timing mechanism energized for completing a single cycle of operation of the apparatus or a plurality of uninterrupted cycles of operation.

2. A beverage making and dispensing apparatus as in claim 1, and means connected to and controlled by the timing mechanism for intermittently supplying a charge of compressed air to said infuser head, while the infuser head is in a lowered position and after the charge of water under pressure is supplied to the infuser head, for expelling the water from the infuser head through the filter package and for drying the infuser head.

References Cited in the file of this patent

UNITED STATES PATENTS

| 1,467,778 | Paola | Sept. 11, 1923 |
| 1,805,159 | Bauer et al. | May 12, 1931 |
| 1,822,433 | Brand | Sept. 8, 1931 |
| 1,837,252 | Carter | Dec. 22, 1931 |
| 1,837,368 | Medin | Dec. 22, 1931 |
| 2,014,325 | Grilli | Sept. 10, 1935 |
| 2,205,290 | Herrera | June 18, 1940 |
| 2,283,967 | Brown | May 26, 1942 |
| 2,392,452 | Baumann | Jan. 8, 1946 |
| 2,529,395 | Hummel | Nov. 7, 1950 |
| 2,761,200 | Arnett | Sept. 4, 1956 |
| 2,879,811 | Parraga | Mar. 31, 1959 |

FOREIGN PATENTS

| 457,264 | France | July 8, 1913 |
| 18,541 | France | Feb. 16, 1914 |
| 258,139 | Italy | Apr. 25, 1927 |
| 293,551 | Great Britain | July 12, 1928 |
| 515,285 | Italy | Feb. 14, 1955 |